(12) United States Patent
Okumura et al.

(10) Patent No.: US 6,726,728 B2
(45) Date of Patent: Apr. 27, 2004

(54) ROLLING BEARING

(75) Inventors: Tsuyoshi Okumura, Osaka (JP);
Hiroyuki Miyazaki, Osaka (JP);
Yoshitaka Nakagawa, Osaka (JP);
Hajime Tazumi, Osaka (JP)

(73) Assignee: Koyo Seiko Co., Ltd., Osaka-fu (JP)

( * ) Notice: Subject to any disclaimer, the term of this patent is extended or adjusted under 35 U.S.C. 154(b) by 0 days.

(21) Appl. No.: 10/049,151

(22) PCT Filed: Jun. 14, 2001

(86) PCT No.: PCT/JP01/05101
§ 371 (c)(1),
(2), (4) Date: Feb. 27, 2002

(87) PCT Pub. No.: WO01/96756
PCT Pub. Date: Dec. 20, 2001

(65) Prior Publication Data
US 2002/0122611 A1 Sep. 5, 2002

(30) Foreign Application Priority Data
Jun. 15, 2000 (JP) ......................................... 2000-179605

(51) Int. Cl.$^7$ ................................................. F16C 33/32
(52) U.S. Cl. ........................ 384/492; 384/569; 384/625
(58) Field of Search ............................... 384/492, 569, 384/625

(56) References Cited

U.S. PATENT DOCUMENTS

| | | | | |
|---|---|---|---|---|
| 4,992,111 A | * | 2/1991 | Yamada et al. ............. | 148/663 |
| 5,030,017 A | * | 7/1991 | Murakami et al. .......... | 384/492 |
| 5,084,116 A | * | 1/1992 | Mitamura .................... | 148/319 |
| 5,385,412 A | * | 1/1995 | Yatabe et al. ................ | 384/492 |
| 5,413,643 A |   | 5/1995 | Mitamura et al. | |
| 5,422,524 A |   | 6/1995 | Nakamura et al. | |
| 5,427,457 A | * | 6/1995 | Furumura et al. .......... | 384/450 |
| 5,433,801 A | * | 7/1995 | Althaus et al. ............. | 148/578 |
| 5,439,300 A | * | 8/1995 | Hirakawa et al. .......... | 384/625 |
| 5,626,974 A | * | 5/1997 | Mitamura .................... | 428/698 |
| 5,658,082 A | * | 8/1997 | Tsushima et al. .......... | 384/492 |
| 5,860,749 A | * | 1/1999 | Hirakawa et al. .......... | 384/492 |
| 5,873,956 A | * | 2/1999 | Tanaka et al. .............. | 148/318 |
| 5,997,661 A | * | 12/1999 | Matsumoto et al. ........ | 148/316 |
| 5,998,042 A | * | 12/1999 | Tanaka et al. .............. | 428/627 |
| 6,012,851 A | * | 1/2000 | Hirakawa et al. .......... | 384/569 |
| 6,095,692 A | * | 8/2000 | Takemura ................... | 384/492 |

FOREIGN PATENT DOCUMENTS

| | | |
|---|---|---|
| GB | 2334967 | 9/1999 |
| JP | 10-159579 | 6/1998 |

* cited by examiner

*Primary Examiner*—David A. Bucci
*Assistant Examiner*—Julie K. Smith
(74) *Attorney, Agent, or Firm*—Jordan and Hamburg LLP

(57) ABSTRACT

A rolling bearing such as a rolling bearing for an alternator of an automobile, the life period of which is prevented from being shortened due to the temporal reduction of a radial internal clearance even in a high temperature environment. The rolling bearing includes a plurality of rolling elements rotatably arranged between an inner race and an outer race, and at least the inner race and the outer race are made of a steel material. An austenite residual rate of the inner race is smaller than an austenite residual rate of the outer race. The amount of dimensional expansion of the outer race due to the martensite transformation of residual austenite is larger than that of the inner race, so that the occurrence of clearance loss is suppressed even when dimensional expansion of the rolling elements occurs.

13 Claims, 3 Drawing Sheets

ROLLING BEARING

FIELD OF THE INVENTION

The present invention relates to a rolling bearing, and more particularly to a rolling bearing which is effectively used in an environment where the bearing temperature becomes high, such as a rolling bearing for an alternator (an AC generator) in an automobile.

BACKGROUND OF THE INVENTION

In recent years, in accordance with the requirements for smaller size and reduced weight and for higher output of an automobile, an alternator is used at high-speed rotation with increasing a pulley ratio. In order to prevent slippage of a belt from occurring, the belt tension tends to be increased.

In a rolling bearing used in such an alternator, action of an offset load and vibrations due to high belt tension occur. The rolling bearing is used at high-speed rotation in such a condition, so that the bearing temperature is raised. It is known that, when a rolling bearing made of a steel material, such as a rolling bearing for an alternator, is used at a high temperature for a long time period, the bearing dimensionally expands.

It is known that the dimensional expansion is caused by transformation of austenite remaining in the steel material into martensite. The radial internal clearance of the rolling bearing is reduced by the dimensional expansion. The reduction of the radial internal clearance causes a problem in that, in a bearing used in an environment with relatively large vibrations, e.g., for supporting a rotation shaft of an auxiliary machine for an engine, the reduction may shorten the life period. In the case where a lubricant is deteriorated, particularly a radial internal clearance which is excessively small significantly affects the reduction of the lubrication life period. Thus, it is necessary to avoid the reduction of the radial internal clearance in a long-term use as much as possible.

For such a purpose as described above, and for preventing white layer peeling from occurring, a steel material in which the residual rate of austenite is reduced to be lower than 10% by volume by performing heat resistance treatment in which high-temperature tempering is used in combination with subzero treatment is conventionally employed in a race of a rolling bearing for which high-speed rotation is-required in a high temperature environment, such as a bearing for an alternator (see Japanese Patent Publication (Kokoku) No. HEI7-72565). In this connection, in the case where usual-thermal treatment is performed, the residual austenite rate is 10 to 14% by volume. As described above, by using a race in which the amount of residual austenite is small, it is possible to suppress the dimensional change due to the transformation of austenite into martensite in the use at a high temperature.

When the service environmental temperature is 180° C. or higher, however, the expansion of rolling elements, i.e., balls, cannot be disregarded. Therefore, it is necessary to suppress the amount of expansion of the balls by changing thermal treatment conditions, e.g., by raising the tempering temperature. However, as for the production of balls, one lot includes a huge number of balls as compared with a race. When the process is changed only for balls of heat resistant specification, therefore, the cost is increased. Thus, it is difficult to practically adopt such balls of heat resistant specification. In view of the situations described above, a conventional rolling bearing of such a type employs balls which are subjected to standard thermal treatment (tempering at 180° C), and hence in which the residual rate of austenite is about 10 to 14%.

In a recent alternator of high-temperature and high speed specification (to be used in such environments where the dmn value is 400,000 or more, the revolution reaches 18,000 rpm, and the temperature exceeds 180° C. (which is the standard tempering temperature), however, the dimensional expansion due to the transformation of austenite into martensite in the steel material of the balls cannot be disregarded, as described above. For example, as for balls of model No. 6202, the expansion of about 10 $\mu$m occurs for one ball, so that a predetermined clearance (+3 to 18 $\mu$m before incorporation, and −5 $\mu$m to +10 $\mu$m as a residual clearance after incorporation, where a tolerance is included) cannot be maintained due to the relative contraction of the race with respect to the balls. Thus, there arises a problem in that clearance loss may be caused and the life period is shortened.

The invention has been conducted in view of the above described circumstances.

OBJECTS AND SUMMARY OF THE INVENTION

It is an object of the invention to provide a rolling bearing such as a rolling bearing for an alternator in which, even when the bearing is used in a high temperature environment, the life period can be prevented from being shortened due to the temporal reduction of a radial internal clearance, without particularly increasing the cost as compared with a conventional rolling bearing of such a type.

In order to attain the above-mentioned object, the rolling bearing of the invention includes a plurality of rolling elements rotatably disposed between an inner race and an outer race, and at least the inner race and the outer race are made of a steel material, an austenite residual rate of the inner race is smaller than an austenite residual rate of the outer race.

In the invention, a configuration in which the austenite residual rate of the outer race is 10% by volume or more, and the austenite residual rate of the inner race is 6% by volume or less can be preferably adopted. A more preferred range of the austenite residual rate of the inner race is 3 & by volume or less. In the invention, in order to realize the configurations of the austenite residual rates of the inner race and the outer race described herein, a configuration in which, among the inner race, the outer race, and the rolling elements, heat resistance treatment is performed only on the inner race may be adopted.

As the heat resistance treatment performed for the inner race, treatment including high-temperature tempering at 200 to 270° C. or higher may be used.

The invention is intended to attain the above mentioned object by setting the amount of dimensional expansion of the outer race to be larger than the amount of dimensional expansion, of the inner race by anticipating dimensional expansion of each member due to the martensite transformation of residual austenite in the steel material.

Specifically, when the residual austenite rate of the outer race is set to be larger than the austenite residual rate of the inner race, amounts of dimensional expansion of respective members caused by transformation of residual austenite into martensite because of the use in a high temperature environment of the outer race are larger than those of the inner race. As a result, it is possible to suppress the reduction of the radial internal clearance due to the dimensional expansion.

In one embodiment of the invention, the austenite residual rate of the outer race is 10% or more and the austenite residual rate of the inner race is 6% by volume or less. When, for example, a rolling bearing having a size similar to that of model No. 6202 is used for a long time period in an environment exceeding 180° C., and when a steel material which is subjected to usual treatment is used for rolling elements, an amount of dimensional expansion caused by the transformation of residual austenite into martensite is about 10 μm, and an amount of dimensional expansion of the outer race is about 20 to 30 μm, but a small dimensional change occurs in the inner race. Even if the rolling bearing is used for a long time period in such an environment, therefore, the occurrence of clearance loss can be effectively prevented from occurring.

In another embodiment of the invention, the austenite residual rate of the inner race is smaller than that of the outer race and this can be attained by performing heat resistance treatment only on the inner race among the inner race, the outer race, and the rolling elements. Accordingly, the above-mentioned functions and effects of the invention can be attained by performing usual heat treatment on the outer race and the rolling elements. Thus, the production cost will not be increased as compared with a conventional rolling bearing for an alternator or the like.

As the heat resistance treatment for setting the austenite residual rate of the inner race to be 6% by volume or less, and more preferably 3 & by volume or less, treatment including high-temperature tempering treatment at 200 to 270° C. or higher, or, in addition to the treatment, subzero treatment is further performed, is suitable.

DETAILED DESCRIPTION OF THE INVENTION

Figure 1:
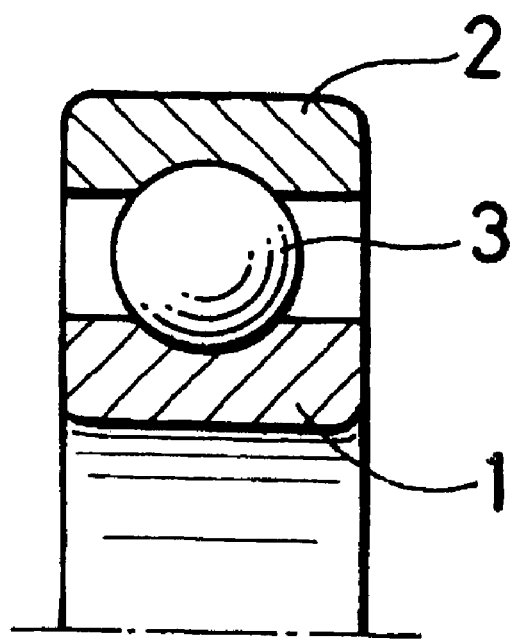
FIG. 1 is a section view taken parallel to the axis and showing a schematic configuration of an embodiment to which the invention is applied.

FIG. 1 is a section view taken parallel to the axis and showing an embodiment of the invention.

A plurality of balls (rolling elements) 3 are rotatably disposed between an inner race 1 and an outer race 2. These members are made of high carbon chrome steel such as SUJ2, respectively. Although not shown in the figures, the rolling elements 3 (also referred to as balls herein) are held by a cage in a circumferential direction at predetermined pitches, and both ends of an annular space formed between the inner race 1 and the outer race 2 are sealed by sealing members, respectively. A lubricant such as grease is sealed in the interior thereof.

In accordance with the invention, the austenite residual rate of the inner race 1 is smaller than the austenite residual rate of the outer race 2. For example, the residual austenite rates of the outer race 2 and the balls 3 are set to be 10 to 14%, and the residual austenite rate of the inner race 1 is set to be about 3%.

In order to obtain such austenite residual rates, as for the outer race 2 and the balls 3, it is possible to employ heat treatment which is similar to standard heat treatment that is performed on members of a usual rolling bearing, that is, a method in which, when the material is SUJ2, the heating temperature for hardening is set to be 820 to 870° C., for example, 845° C., and tempering is performed at 160 to 180° C., for example 180° C. after oil quenching.

On the other hand, as for the inner race 1, when SUJ2 is similarly used, a method in which, after the same hardening s described above, high-temperature tempering at 200 to 270° C. is performed, or a method in which, in addition to the high-temperature tempering, the subzero treatment (80° C.) is performed can be applied. If the tempering temperature exceeds 270° C., functions required in a bearing member such as a desired hardness cannot be exerted.

According to the above-described embodiment of the invention, when the bearing is used in a long time period in a high temperature environment, austenite remaining in the members or the inner race 1, the outer race 2, and the rolling elements 3 transforms into martensite. Thus, dimensional expansion occurs in the respective members. Since the austenite residual rate of the inner race 1 is smaller than that of the outer race 2, the dimensional expansion of the outer race 2 is larger than that of the inner race 1 by a degree corresponding to the reduction of the austenite residual rite of the inner race 1 from that the outer race 2. Even when dimensional expansion of the balls 3 occurs, reduction in the radial internal clearance due to the martensite transformation does not occur or is decreased in degree. As a result, even in a severe use of, for example, a bearing for an alternator in a high temperature environment, it is possible to suppress the reduction of life period due to the radial internal clearance loss.

When the rolling bearing of the embodiment of the invention with the above-mentioned fundamental configuration of the inner race 1, the outer race 2, and the balls 3 is used in an environment at a high temperature higher than 180° C., other members such as the cage and seals which constitute the rolling bearing, or the sealed grease are required to be resistant to the high temperature environment. Examples of such members and the grease are as follows. As for the cage, it is necessary to prevent melting or deformation due to the high temperature, and also to prevent the case from interfering with other components. As a material for the cage suitable for the use, a material in which reinforcing graphite is added to PA46 (polyamide 46) having superior heat resistance, PEEK (polyether ether ketone), or the like may be employed.

As for the seal, in order to maintain the sealing property, a seal of fluoro rubber which hardens at a low degree and remains elastic even after a long term use at a high temperature maybe used. In some cases, the temperature of the seal is lower than that of the race. In such cases, therefore, an ethylene acrylic rubber or the like may be used.

On the other hand, as for the grease, fluorocarbon grease which can be used even at the highest temperature of 200° C. may be suitably used.

According to a rolling bearing in which the above described components and grease are combined with the inner race 1, the outer race 2, and the balls 3 in the above-mentioned embodiment of the invention, even in a continuous operation at high revolutions of 18,000 rpm in a high temperature environment of 200 C, endurance of 1,000 hours or more is observed and the bearing has a sufficiently long life period.

Next, in order to confirm the effects of the invention, the inner race 1 on which heat resistance treatment was performed was produced, and used for a long time period in an environment at 180° C. and the elapsed time period and the dimensional change rate were then actually measured. Results of the measurements will be described below.

Figure 2:
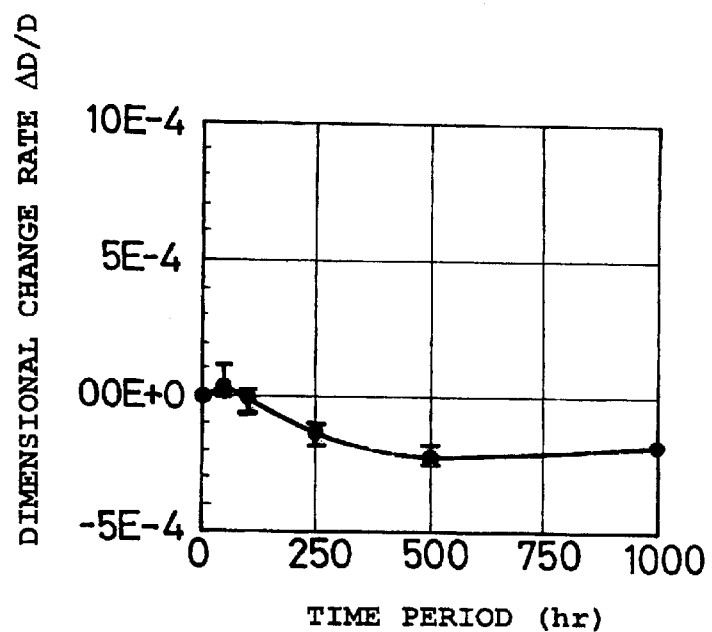
FIG. 2 is a graph illustrating results of measurement of relationships between an elapsed time period and a dimensional change rate in a high temperature environment in the case where the material of an inner race 1 is SUJ2 according to the JIS, and heat resistance treatment by high-temperature tempering at 200° C. and subzero treatment was performed.
Figure 3:
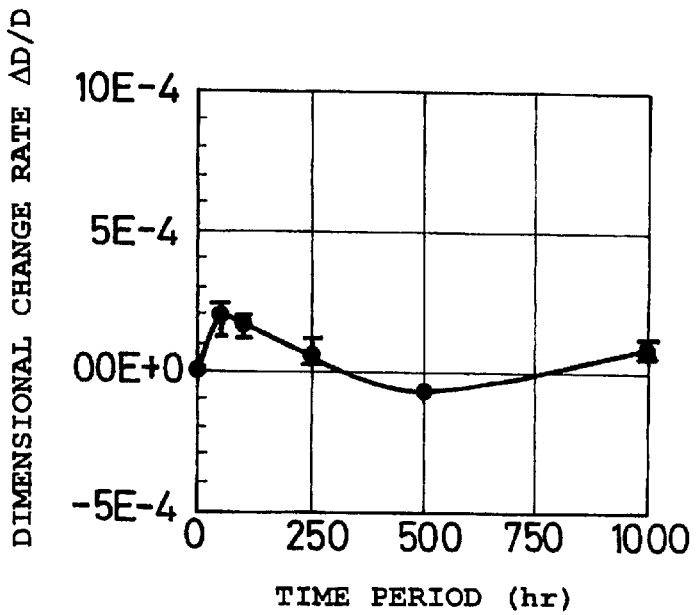
FIG. 3 is a graph illustrating results of measurement of relationships between an elapsed time period and a dimensional change rate in a high temperature environment in the case where the material of the inner race 1 is SUJ2, and heat resistance treatment by high-temperature tempering at 200° C. was performed.
Figure 4:
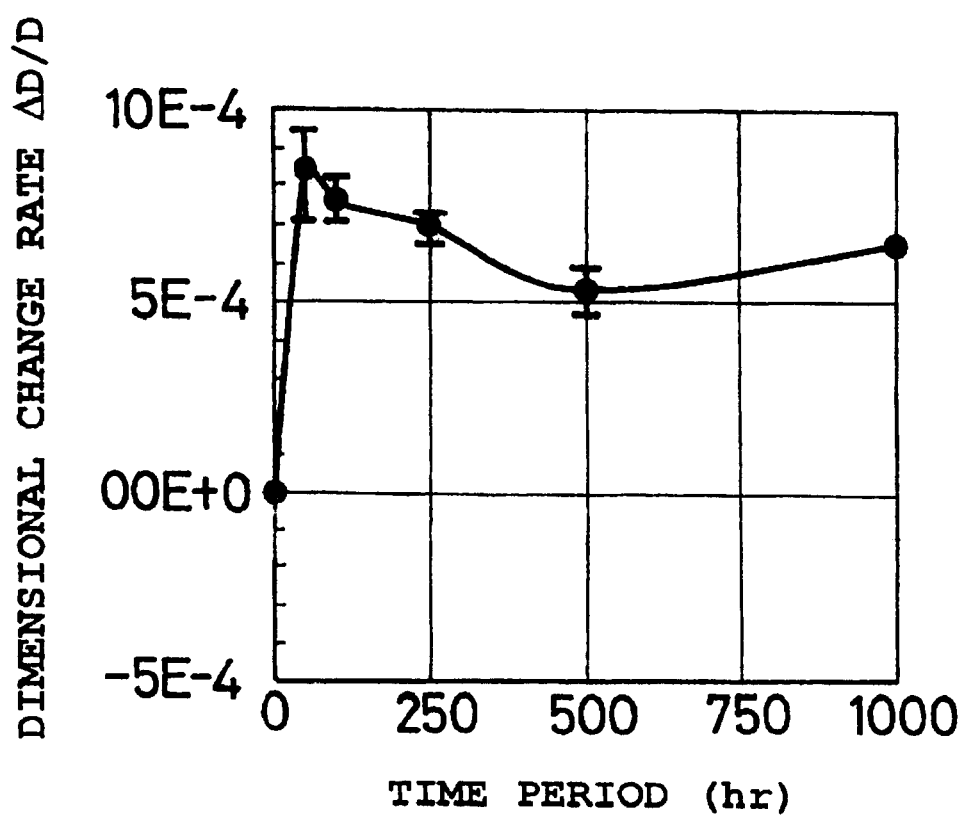
FIG. 4 is a graph illustrating results of measurement of relationships between an elapsed time period and a dimensional change rate in a high temperature environment when the material of the inner race 1 is SUJ2, and usual treatment (tempering at 180 C) was performed.

FIG. 2 is a graph illustrating results of measurements on inner races in which SUJ2 according to the JIS was used as the material, and, after usual hardening (the hardening temperature is 845° C., and this value is applied also to the following hardening processes), high-temperature tempering at 200° C. was then performed. In this case, the hardness of the obtained inner race was 58 to 63 HRC. FIG. 3 is a graph illustrating results of measurements on inner races in which SUJ2 was similarly used as the material, and, after usual hardening, subzero treatment at −80 C was performed and high temperature tempering at 0° C. was performed. The hardness of the inner race in this case was 59 to 63 HRC. FIG. 4 is a graph illustrating results of measurements on inner races in which SUJ2 was similarly used as the material and, after usual treatment, i.e., usual hardening, tempering at 180° C. was performed. The hardness of the inner race in this case was 58 to 63 HRC.

In the graphs, the ordinate represents the ratio of a change amount $\Delta D$ to the diameter D of the inner race, i.e. the dimensional change rate $\Delta D/D$. Specifically, $00E^{+0}$ indicates a change range of $0.5E^4$ indicates expansion of $10^{-4}$, and $-5E_{-4}$ indicates contraction of $10^4$. The abscissa represents the elapsed time period in a high temperature environment. Horizontal bars positioned above and below the plots on the graph indicate the ranges of the results of measurements of a plurality of samples.

As apparent from FIGS. 2–4, in inner races on which high-temperature tempering treatment at 200° C. was performed, or in addition to the treatment, subzero treatment was performed, the dimensional change rate is small even after a long-term use in a high temperature environment, as compared with comparative examples on which usual treatment was performed. Accordingly, it was found that, even when balls dimensionally expand, occurrence of clearance loss can be effectively suppressed by the combination with the outer race on which usual treatment is performed. It is seen that, when the tempering temperatures is set to be in a range from about 200° C. to 270° C. in place of the heat resistance treatment from which the results in FIGS. 2 and 3 were obtained, the austenite residual rate is 65 by volume or less, an inner race can be obtained in which dimensional expansion is small even after a long-term use in a high temperature environment while the hardness required in an inner race of a bearing is attained.

Herein, the materials of the inner race 1 and the outer race 2 in the invention are not limited to high carbon chrome steel such as SUJ2 according to the JIS. Alternatively, the material may be stainless steel such as SUS 440C. Also in the alternative, the same functions and effects as described above can be attained by performing the heat resistance treatment on the inner race 1 and the usual heat treatment on the outer race 2.

As an example of the heat resistance treatment in the case where the material of the inner race is SUS 440C, a method in which hardening at 1,050° C. is performed, and, after subzero treatment at −80 C, high-temperature tempering at 520° C. is performed (the hardness of about 54 to 55 HRC), a method in which, after the same hardening as described above is performed, tempering at about 220° C. is performed twice (the hardness of 60 to 61 HRC), or the like can be applied. By the treatment the austenite residual rate is set to be 6% by volume or less, so that an inner race in which dimensional expansion is small even after a long-term use in a high temperature environment can be obtained. By the combination with an outer race on which usual treatment is performed, it is possible to effectively prevent the clearance loss from occurring.

In the invention, it is sufficient that the austenite residual rate of the inner race is smaller than that of the outer race. Thus, the invention is not restricted to the configuration employing balls with the same austenite residual rate as that of the outer race, that is, balls on which usual treatment is performed. In other words, in the invention, balls in which the austenite residual rate is reduced by heat resistance treatment can be used. In this case, with respect to the amount of dimensional expansion clue to the martensite transformation of the residual austenite. the inner race and the balls are small, and the outer race is relatively large, so that the clearance loss can be more effectively prevented from occurring. As for the balls, the number of balls included in one lot is huge as described above, and hence it is necessary to consider that the cost of the balls is increased in order to change the process for the heat resistance treatment, as compared with the case where the heat resistance treatment is performed only on the inner race.

The invention can be applied also to a rolling bearing in which balls are formed by ceramics primarily containing silicon nitride. In this case, the dimension expansion of the balls does not substantially occur. When the heat resistance treatment is performed only on the inner race, therefore, the same functions and effects as described above can be attained.

As described above, according to the invention, the rate of austenite remaining in the outer race is set to be larger than that of the inner race. Even after a long-term use in a high temperature environment, the amount of dimensional expansion of the outer race due to the martensite transformation of austenite is larger than that of the inner race. As a result, it is possible to prevent reduction of the radial internal clearance due to the martensite transformation of the steel material from occurring, and it is possible to suppress reduction of the life period caused by such reduction.

The above-mentioned effects can be attained simply by performing heat resistance treatment such as high temperature tempering, and subzero treatment on only the inner race, and by performing usual heat treatment on the outer race and the rolling elements. Therefore, there exists an additional advantage that the embodying of the invention does not constitute a factor of increasing the cost.

What is claimed is:

1. A rolling bearing, comprising:
   an inner race made of a steel material;
   an outer race made of a steel material and spaced from said inner race to defined a radial internal clearance therebetween; and
   a plurality of rolling elements rotatably arranged in the clearance between said inner race and said outer race,
   said inner race having an austenite residual rate smaller than an austenite residual rate of said outer race such that reduction in the radial internal clearance caused by dimensional expansion of the steel material in said inner and outer races upon exposure to high temperatures is suppressed, the austenite residual rates of said outer race and said rolling elements being 10% or more, and the austenite residual rate of said inner race being 6% or less.

2. A rolling bearing according to claim 1, wherein, among said inner race, said outer race, and said rolling elements, heat resistance treatment is performed only on said inner race.

3. A rolling bearing according to claim 2, wherein said heat resistance treatment on said inner race includes high-temperature tempering at 200 to 270° C. or higher.

4. A rolling bearing according to claim 1, wherein the austenite residual rates of said outer race and said rolling elements are substantially the same.

5. A rolling bearing according to claim 1, wherein the austenite residual rates of said outer race and said rolling elements are from 10 to 14%.

6. A rolling bearing according to claim 1, wherein the austenite residual rates of said inner race is about 3%.

7. A rolling bearing according to claim 1, wherein the austenite residual rates of said outer race and said rolling elements are from 10% to 14% and the austenite residual rate of said inner race is about 3%.

8. A rolling bearing according to claim 1, wherein as a result of the austenite residual rate of said inner race being smaller than the austenite residual rate of said outer race, dimensional expansion of said outer race is larger than dimensional expansion of said inner race.

9. A rolling bearing according to claim 1, wherein the smaller austenite residual rate of said inner race relative to said outer race is achieved by performing heat resistance treatment only on said inner race and not on said outer race and said rolling elements.

10. A rolling bearing according to claim 3, wherein said heat resistance treatment further includes subzero treatment at −80° C.

11. A rolling bearing according to claim 1, wherein said rolling elements are formed by ceramics which do not dimensionally expand upon exposure to heat and thus do not have a residual austenite rate.

12. A rolling bearing according to claim 11, wherein said ceramic rolling elements primarily contain silicon nitride.

13. A rolling bearing according to claim 1, wherein said rolling elements have a negligible residual austenite rate such that dimensional expansion of said rolling elements is not caused upon exposure of said rolling elements to heat.

* * * * *